(12) United States Patent
Ballabani et al.

(10) Patent No.: US 11,231,297 B2
(45) Date of Patent: Jan. 25, 2022

(54) PROVIDING AVAILABILITY OF ROTARY POSITION SENSOR INFORMATION AFTER HARDWARE FAILURES

(71) Applicant: Robert Bosch GmbH, Stuttgart (DE)

(72) Inventors: Kristian Ballabani, Schorndorf (DE); Wolfgang Baierl, Schorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 105 days.

(21) Appl. No.: 16/738,558

(22) Filed: Jan. 9, 2020

(65) Prior Publication Data
US 2021/0215513 A1  Jul. 15, 2021

(51) Int. Cl.
*G01D 5/244* (2006.01)
*B62D 5/04* (2006.01)

(52) U.S. Cl.
CPC ..... *G01D 5/24457* (2013.01); *G01D 5/24476* (2013.01); *B62D 5/0463* (2013.01); *B62D 5/0484* (2013.01)

(58) Field of Classification Search
CPC . G01D 5/24457; G01D 5/24476; G01D 5/485
See application file for complete search history.

(56) References Cited

U.S. PATENT DOCUMENTS

| | | | |
|---|---|---|---|
| 9,097,509 B2* | 8/2015 | Abe | G01B 7/30 |
| 9,590,553 B2 | 3/2017 | Kanazawa et al. | |
| 9,963,140 B2 | 5/2018 | Orlamunder | |
| 10,116,243 B2* | 10/2018 | Lu | H02P 6/186 |
| 2002/0177932 A1 | 11/2002 | Kifuku et al. | |
| 2008/0116886 A1* | 5/2008 | Yamada | G01D 5/145 324/207.21 |
| 2010/0045272 A1* | 2/2010 | Kondo | G01D 5/145 324/207.13 |
| 2010/0321006 A1* | 12/2010 | Suzuki | G01P 3/487 324/207.25 |
| 2011/0087456 A1* | 4/2011 | Satou | B62D 15/0235 702/151 |
| 2014/0191625 A1* | 7/2014 | Kitamoto | H02K 11/25 310/68 B |
| 2016/0178403 A1* | 6/2016 | Bilger | G01D 5/24461 324/207.21 |

(Continued)

FOREIGN PATENT DOCUMENTS

| | | |
|---|---|---|
| DE | 102016103518 A1 | 8/2017 |
| WO | WO2017148625 A1 | 9/2017 |

*Primary Examiner* — Bickey Dhakal
(74) *Attorney, Agent, or Firm* — Michael Best & Friedrich LLP (57) ABSTRACT

Methods and systems for providing rotary position sensor information. One system includes an electronic processor configured to receive a first set of signals from a first bridge circuit of a rotary position sensor and receive a second set of signals from a second bridge circuit of the rotary position sensor. In response to the receipt of the first set of signals from the first bridge circuit stopping, the electronic processor is also configured to identify a fault associated with the first bridge circuit. The electronic processor is also configured to receive a pulse signal and determine a rotary angle based on the pulse signal and the second set of signals from the second bridge circuit. The electronic processor is configured to generate an output torque value based on the rotary angle for controlling a motor.

15 Claims, 9 Drawing Sheets

(56) References Cited

U.S. PATENT DOCUMENTS

| | | |
|---|---|---|
| 2018/0013334 A1 | 1/2018 | Ishikura et al. |
| 2018/0067146 A1* | 3/2018 | Kawanami ............ G01R 15/205 |
| 2018/0183369 A1 | 6/2018 | Kanazawa et al. |
| 2018/0248451 A1 | 8/2018 | Hagiwara |
| 2019/0023315 A1 | 1/2019 | Takizawa et al. |
| 2020/0318993 A1* | 10/2020 | Baranyai ................ G01D 5/12 |

* cited by examiner

```
for i = 1:length(quad)
    if quad(i) == 0 && sin(i)>0 angle_calc(i) = asind(sin(i)) ;

elseif sin(i) > 0 && quad(i) == 1
        angle_calc(i) =180 - asind(sin(i));

elseif sin(i) < 0 && quad(i) == 0
        angle_calc(i) = 180- asind(sin(i));

elseif sin(i) < 0 && quad(i) == 1
        angle_calc(i) =360+asind(sin(i));
    else
        angle_calc(i) = asind(sin(i));
    end end
```

*FIG. 9*

PROVIDING AVAILABILITY OF ROTARY POSITION SENSOR INFORMATION AFTER HARDWARE FAILURES

FIELD

Embodiments relate to providing sensor information to a vehicle system and, more particularly, to providing rotary position sensor information to an electric power steering system.

SUMMARY

Electric power steering (EPS) systems are designed with partial or full redundancy in logic to meet safety and system availability requirements. For certain components that are critical to the system, some requirements are extended to increase the system availability in the event of a single component failure. One such a component is a rotary position sensor (RPS), which may be used to sense rotor position of an electric motor used in an EPS system. In many EPS systems, RPS information is important to providing precise, closed-loop control of electric motor torque. Due to the high precision required for the rotary position information, analog position sensors are preferred. An analog sensor, obviously, produces an analog signal. In current systems, analog RPSs are often magneto resistive sensors that change their resistivity due to changes in magnetic field direction or magnitude depending on the particular technology used.

So-called "high availability" EPS systems are equipped with redundant RPSs, where one sensor is respectively connected to each part of the system. In the case of a failure of one RPS, the respective subsystem is shut down and the system torque output signal is limited to 50% of the maximum available output torque. Embodiments described herein provide, among other things, a system that provides an output having 100% (or nearly 100%) of the available output torque even if one of the RPSs fails.

Embodiments described herein provide, among other things, methods and systems of providing power steering to a vehicle with enhanced availability of a rotary position sensor signal. In one example embodiment described herein, a rotary position sensor signal is provided by using remaining valid signals to calculate a rotary angle. The EPS system receiving the calculated RPS signal is able to continue to provide steering assist for the driver. This also mitigates loss of assist scenarios after a hardware (for example, RPS) failure.

For example, one embodiment provides a system for providing rotary position sensor information. The system includes an electronic processor configured to receive a first set of signals from a first bridge circuit of a rotary position sensor and receive a second set of signals from a second bridge circuit of the rotary position sensor. In response to the receipt of the first set of signals from the first bridge circuit stopping, the electronic processor is also configured to identify a fault associated with the first bridge circuit. The electronic processor is also configured to receive a pulse signal and determine a rotary angle based on the pulse signal and the second set of signals from the second bridge circuit. The electronic processor is configured to generate an output torque value based on the rotary angle for controlling a motor.

Another embodiment provides a method for providing rotary position sensor information. The method includes receiving, with an electronic processor, a first set of signals from a first bridge circuit of a rotary position sensor. The method also includes receiving, with the electronic processor, a second set of signals from a second bridge circuit of the rotary position sensor. The method also includes, in response to the receipt of the first set of signals from the first bridge circuit stopping, identifying, with the electronic processor, a fault associated with the first bridge circuit. The method also includes receiving, with the electronic processor, a pulse signal. The method also includes determining, with the electronic processor, a rotary angle based on the pulse signal and the second set of signals from the second bridge circuit. The method also includes controlling a motor based on the rotary angle.

Yet another embodiment provides a non-transitory, computer-readable medium storing instructions that, when executed by an electronic processor, perform a set of functions, the set of functions including receiving a first set of signals from a first bridge circuit of a rotary position sensor. The set of functions also includes receiving a second set of signals from a second bridge circuit of the rotary position sensor. The set of functions also includes, in response to the receipt of the first set of signals from the first bridge circuit stopping, identifying a fault associated with the first bridge circuit. The set of functions also includes receiving a pulse signal. The set of functions also includes determining a rotary angle based on the pulse signal and the second set of signals from the second bridge circuit. The set of functions also includes controlling a motor based on the rotary angle.

Other aspects and embodiments of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software based devices, as well as a plurality of different structural components may be utilized to implement the invention.

Figure 1:
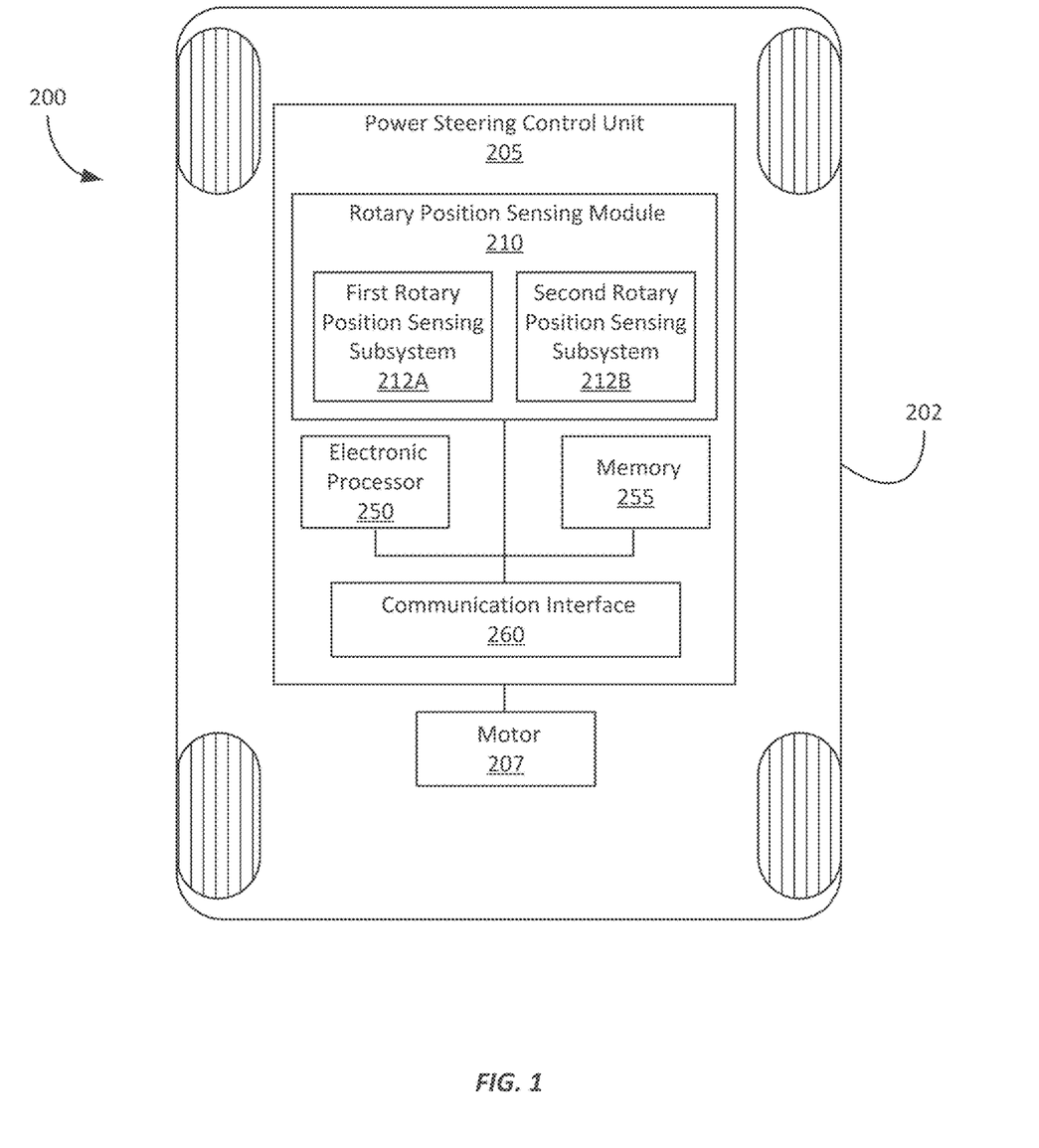
FIG. 1 schematically illustrates a system of providing power steering assist according to some embodiments.

FIG. 1 illustrates a system 200 for providing power steering (steering assist) to a vehicle 202 according to some embodiments. As illustrated in FIG. 1, the system 200 includes a power steering control unit 205 and a motor 207. In some embodiments, the system 200 includes fewer, additional, or different components than those illustrated in FIG. 1 in various configurations and may perform additional functionality than the functionality described herein. Additionally, in some embodiments, the system 200 is an electronic power steering ("EPS") system for the vehicle 202.

The power steering control unit 205 is configured to calculate an amount of steering assist for a driver of the vehicle 202 and to control the motor 207 such that a corresponding output torque is provided. In the example illustrated in FIG. 1, the power steering control unit 205 includes an electronic processor 250 (for example, a microprocessor, an application specific integrated circuit, or another suitable electronic device), a memory 255 (for example, one or more non-transitory computer-readable storage mediums), a communication interface 260, and a rotary position sensing module 210. The electronic processor 250, the memory 255, the communication interface 260, and the rotary position sensing module 210 communicate over one or more data connections or buses. The power steering control unit 205 illustrated in FIG. 1 represents one example, and, in some embodiments, the power steering control unit 205 includes fewer, additional, or different components in different configurations than illustrated in FIG. 1. Also, in some embodiments, the power steering control unit 205 performs functionality in addition to the functionality described herein.

The electronic processor 250 is configured to retrieve instructions from the memory 255 and execute instructions to perform a set of functions, including the methods described herein. For example, in some embodiments, the electronic processor 250 executes instructions for providing steering assist to a driver of the vehicle 202 (for example, generating an output torque value for controlling the motor 207). The memory 255 may include combinations of different types of memory, such as read-only memory ("ROM"), random access memory ("RAM"), or another non-transitory computer readable medium. As noted above, the memory 255 stores instructions executed by the electronic processor 250. Accordingly, the memory 255 may store firmware, one or more applications, program data, filters, rules, one or more program modules, and other executable instructions or data.

The communication interface 260 allows the power steering control unit 205 to communicate with devices external to the power steering control unit 205 (for example, receive input from and provide output to devices external to the power steering control unit 205). In some embodiments, the communication interface 260 includes a port for receiving a wired connection with devices external to the power steering control unit 205. Alternatively or in addition, the communication interface 260 communicates with a communication bus (for example, a controller area network ("CAN")) to indirectly communicate with devices external to the power steering control unit 205.

The rotary position sensing module 210 is configured to sense rotary motion of an actuator (i.e., determine a rotary angle of an actuator). For example, in some embodiments, the rotary position sensing module 210 senses rotary motion of the motor 207. In such embodiments, the rotary position sensing module 210 determines a rotary angle (i.e., a rotor angle) for a rotor of the motor 207. The rotary angle is used to generate an output torque value for the motor 207, which controls the steering of the vehicle 202 (for example, provides power steering assist for a driver of the vehicle 202). Alternatively or in addition, the rotary position sensing module 210 senses rotary motion with respect to additional or different actuators. For example, the rotary position sensing module 210 may sense a rotary angle of a steering wheel of the vehicle 202, a rotary angle of an engine crank shaft, and the like.

Figure 2:
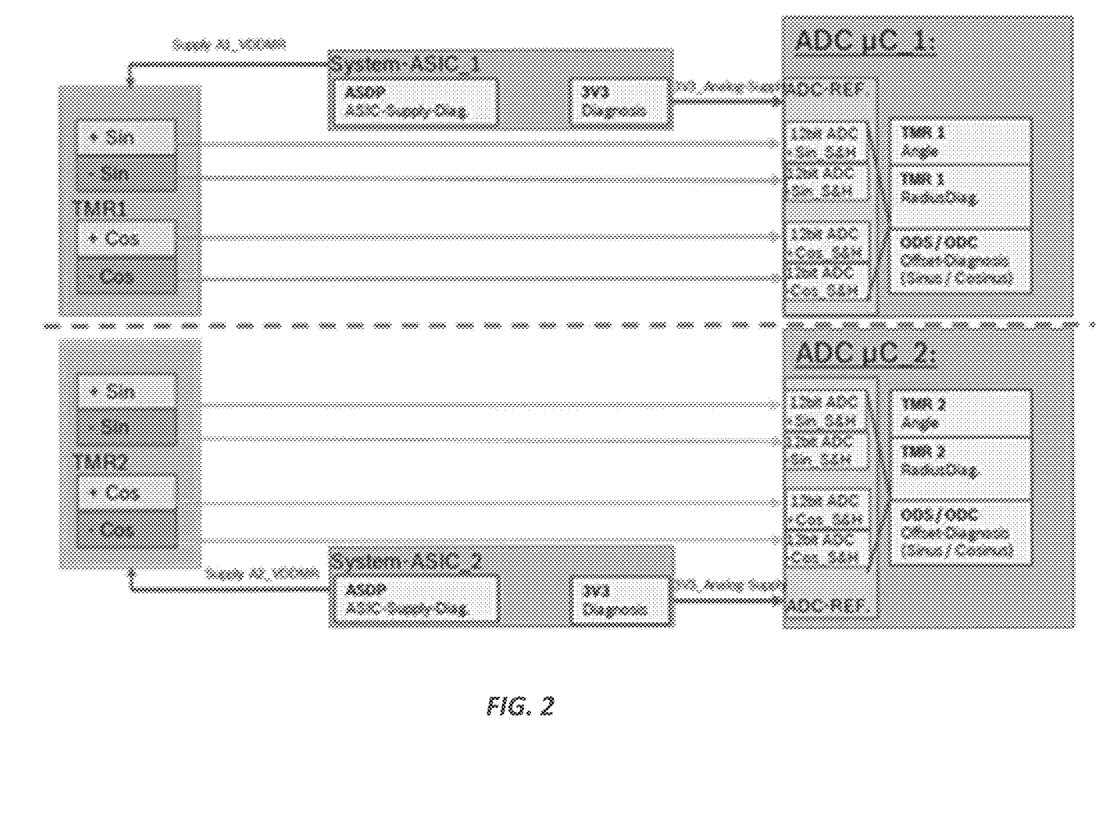
FIG. 2 illustrates an example system architecture of a rotary position sensing module included in the system of FIG. 1 according to some embodiments.

As illustrated in FIG. 1, the rotary position sensing module 210 includes a first rotary position sensing subsystem 212A and a second rotary position sensing subsystem 212B. In some embodiments, the rotary position sensing module 210 includes additional or different components than those illustrated in FIG. 1, such as a third rotary position sensing subsystem. Accordingly, in some embodiments, the system 200 of FIG. 1 is equipped with redundant rotary position sensing. FIG. 2 illustrates an example system architecture equipped with redundant rotary position sensing according to some embodiments.

Figure 3:
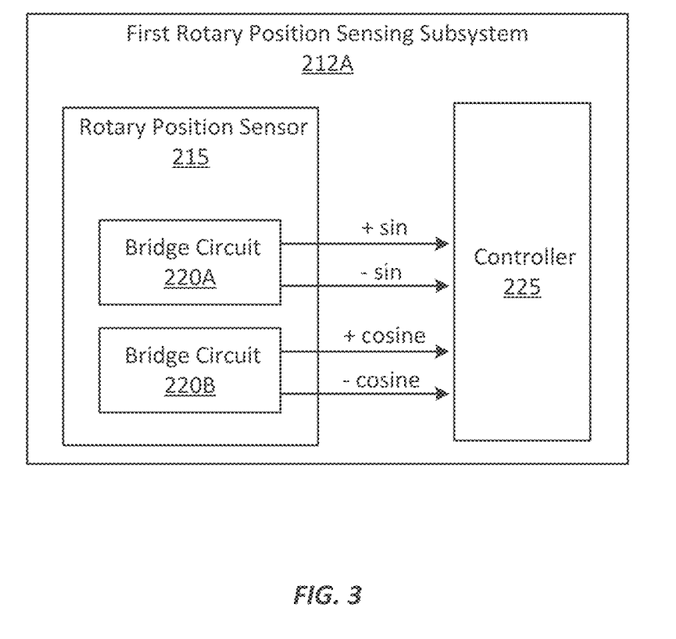
FIG. 3 illustrates a first rotary position sensing subsystem according to some embodiments.

FIG. 3 illustrates the first rotary position sensing subsystem 212A according to some embodiments. In the illustrated example, the first rotary position sensing subsystem 212A includes a rotary position sensor 215 and a controller 225 (for example, a microcontroller). As noted above, the rotary position sensor 215 may be a rotor position sensor associated with the motor 207 (for example, as part of an electronic power steering system of the vehicle 202). In some embodiments, the rotary position sensor 215 is a magneto resistive sensor that changes resistivity due to changes in magnetic field direction, magnitude, or a combination thereof. In other embodiments, the rotary position sensor 215 is a tunnel-effect magneto resistive sensor that changes resistivity with a direction of a magnetic field. Accordingly, in some embodiments, the first rotary position sensing subsystem 212A unambiguously measures a rotary angle, such as a rotor angle of the motor 207, over a 360 degree range.

As illustrated in FIG. 3, the rotary position sensor 215 includes a first bridge circuit 220A and a second bridge circuit 220B (referred to herein collectively as "the bridge circuits 220"). The rotary position sensor 215 illustrated in FIG. 3 represents one example, and, in some embodiments, the rotary position sensor 215 includes fewer, additional, or different components in different configurations than illustrated in FIG. 3, such as a third bridge circuit. In some embodiments, the bridge circuits 220 are Wheatstone bridge circuits. The bridge circuits 220 are at a 90 degree angle relative to one another. In other words, the first bridge circuit 220A is at a 90 degree angle relative to the second bridge circuit 220B.

As seen in FIG. 3, each of the bridge circuits 220 output two output signals. In some embodiments, the output signals from each of the bridge circuits 220 are differential, sinusoidal signals. As noted above, the bridge circuits 220 are at a 90 degree angle relative to one another. Accordingly, the output signals from each of the bridge circuits 220 are at a 90 degree phase shift relative to one another. In other words, as illustrated in FIG. 3, the first bridge circuit 220A outputs sine signals (i.e., +sine and −sine) while the second bridge circuit 220B outputs cosine signals (i.e., +cosine and −cosine).

The output signals from the bridge circuits 220 may be transmitted to the controller 225. Although not illustrated in FIG. 3, the controller 225 may include, for example, an electronic processor, a memory, and a communication interface (similar to the electronic processor 250, the memory 255, and the communication interface 260 of the power steering control unit 205). Alternatively or in addition, the output signals from the rotary position sensor 215 may be provided directly to another device or component, such as the electronic processor 250. Accordingly, in some embodiments, the functionality of the controller 225 is provided by the electronic processor 250. In other words, in some embodiments, the functionality of the electronic processor 250, the controller 225, a controller associated with the second rotary position sensing subsystem 212B, or a combination thereof is combine into a single controller, such as the electronic processor 250, the controller 225, a controller associated with the second rotor position sensing subsystem 212B, or a combination thereof. The output signals from the bridge circuits 220 may be used to calculate a rotary angle. In some embodiments, the output signals from the bridge circuits 220 are used to calculate a rotor angle of the motor 207, and, ultimately, used to generate and provide an output torque value for controlling the motor 207 (via the electronic processor 250, the controller 225, a controller associated with the second rotary position sensing subsystem 212B, or a combination thereof).

As noted above, in some embodiments, the system 200 of FIG. 1 is equipped with redundant rotary position sensing. Redundant rotary position sensing is provided via the first rotary position sensing subsystem 212A and the second rotary position sensing subsystem 212B. Although the second rotary position sensing subsystem 212B is not illustrated or described in detail (for sake of brevity), it should be understood that the second rotary position sensing subsystem 212B may include similar components as the first rotary position sensing subsystem 212A (for example, a rotary position sensor, a first bridge circuit, a second bridge circuit, a controller, and the like) and performs similar functionality as described herein with respect to the first rotary position sensing subsystem 212A.

Figure 4:
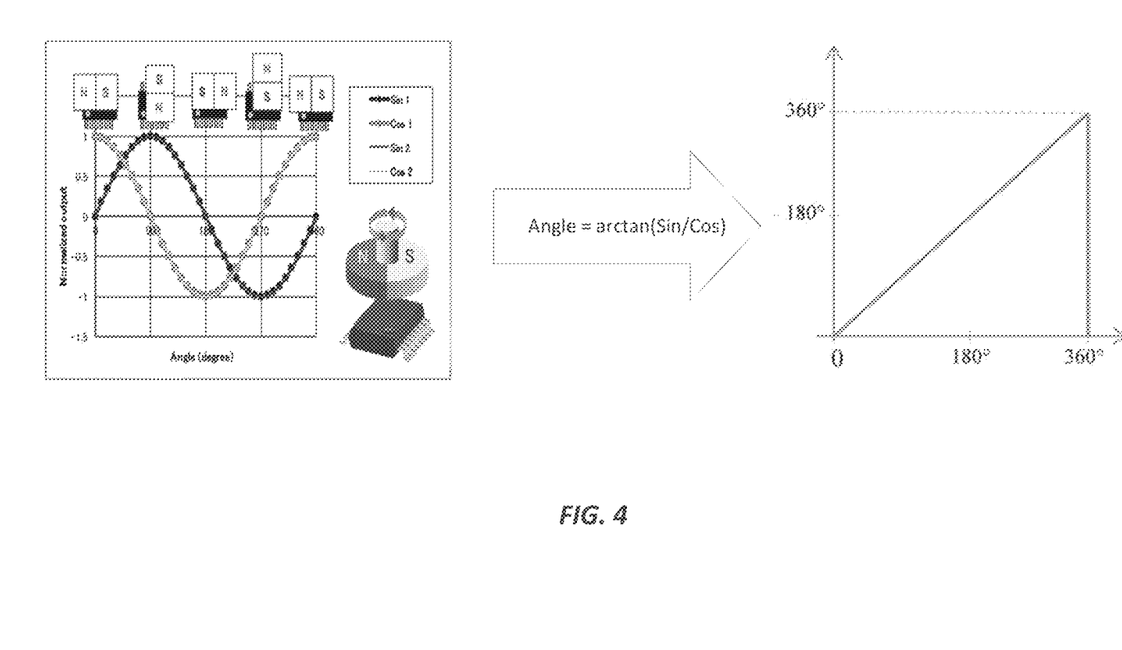
FIG. 4 illustrates a rotary position measurement principle according to some embodiments.

During normal operation (i.e., a non-failure or non-fault mode), the controller 225 uses both output signals to measure a rotary angle over a 360 degree range. In particular, using both of the output signals, the controller 225 may differentiate between quadrants (for example, a first quadrant, a second quadrant, a third quadrant, and a fourth quadrant) of a coordinate system, such as the unit circle, and calculate the rotary angle as the arctangent (sin/cosine). For example, FIG. 4 provides an illustrative representation of the measurement principle associated with a tunnel magnetoresistive sensor, such as the rotary position sensor 215, where a rotary angle may be unambiguously measured over a 360 degree range.

However, when one of the bridge circuits 220 fails, the controller 225 no longer receives both output signals. As noted above, to solve these and other problems, embodiments described herein provide enhanced availability of a rotary position sensor signal by using remaining valid signals to calculate (or determine) a rotary angle. By replacing the lost signal with a calculated value, an EPS is able to continue to provide steering assist for a driver while also mitigating loss of assist scenarios after a hardware failure.

In one example embodiment, a pulse signal is used to differentiate between quadrants of a coordinate system. As described in greater detail below, in one example, a rotary position sensing subsystem (for example, the first rotary position sensing subsystem 212A or the second rotary position sensing subsystem 212B) with a failed bridge circuit calculates the rotary angle using the bridge circuit that is still functioning and the pulse signal.

Figure 5:
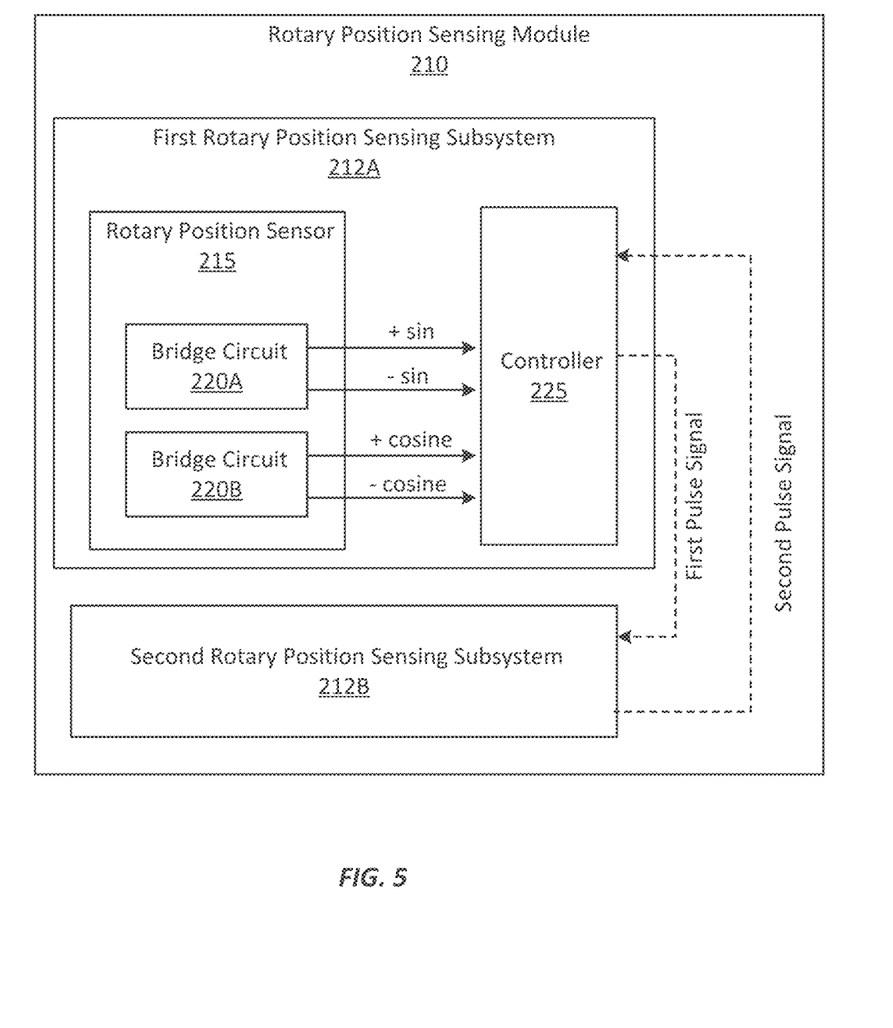
FIG. 5 illustrates the rotary position sensing module according to some embodiments.

Among other advantages provided, some embodiments described herein may be implemented with minimal changes to current hardware configurations. For example, some embodiments described herein may be implemented with the addition of two lines for transmitting each pulse signal to a respective controller of an associated rotary position sensing subsystem. For example, FIG. 5 illustrates the example system architecture of FIG. 2 with the addition of two lines for transmitting the pulse signals according to some embodiments.

Figure 6:
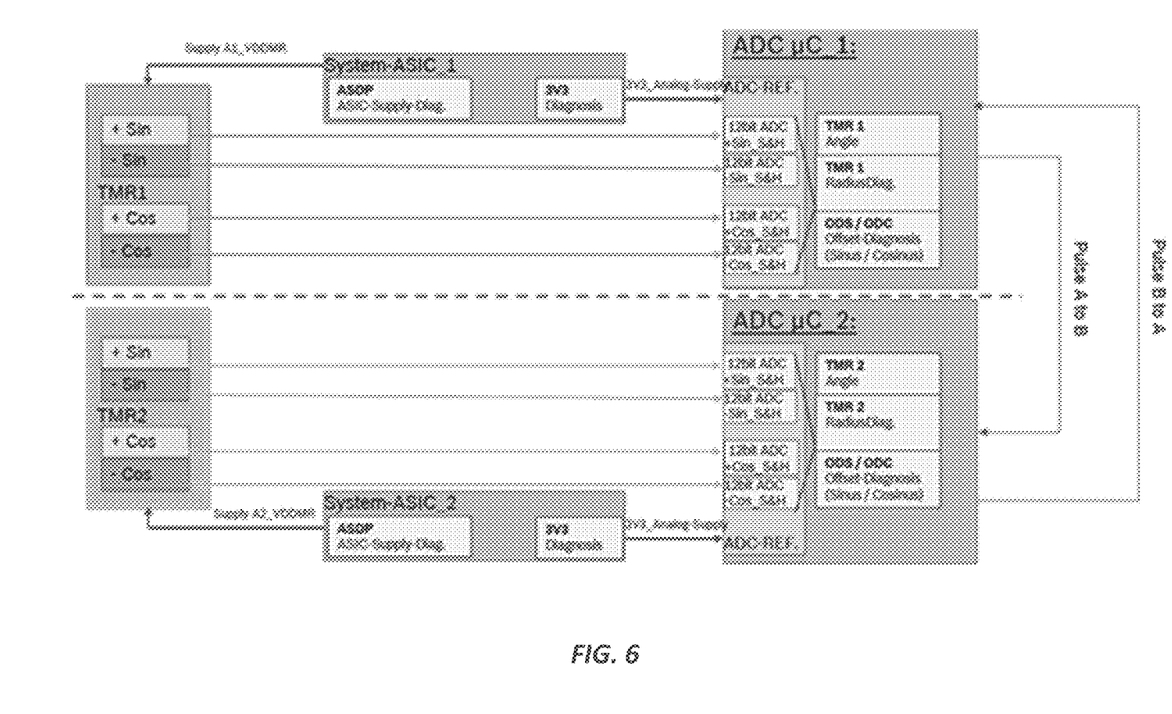
FIG. 6 illustrates the example system architecture of FIG. 2 with the addition of two lines for transmitting the pulse signals according to some embodiments.

FIG. 6 illustrates a method 500 for providing steering assist according to some embodiments. The method 500 is described herein as being performed by the controller 225 (an electronic processor executing instructions). However, as noted above, the functionality performed by the controller 225 (or a portion thereof) may be performed by other devices, including, for example, the electronic processor 250, a controller associated with the second rotary position sensing subsystem 212B (via an electronic processor executing instructions), or a combination thereof.

As illustrated in FIG. 6, the method 500 includes receiving, with an electronic processor of the controller 225, a first set of signals from the first bridge circuit 220A of the rotary position sensor 215 (at block 505). The electronic processor of the controller 225 also receives a second set of signals from the second bridge circuit 220B of the rotary position sensor 215 (at block 510). As illustrated in FIG. 3, the first set of signals may include a +sin signal and a −sin signal and the second set of signals may include a +cosine signal and a −cosine signal. In some embodiments, the controller 225 continuously receives the first set of signals and the second set of signals during normal operation of the system 200. In response to the receipt of the first set of signals from the first bridge circuit 220A stopping, the electronic processor of the controller 225 may identify a fault associated with the first bridge circuit 220A (at block 515).

Figure 7:
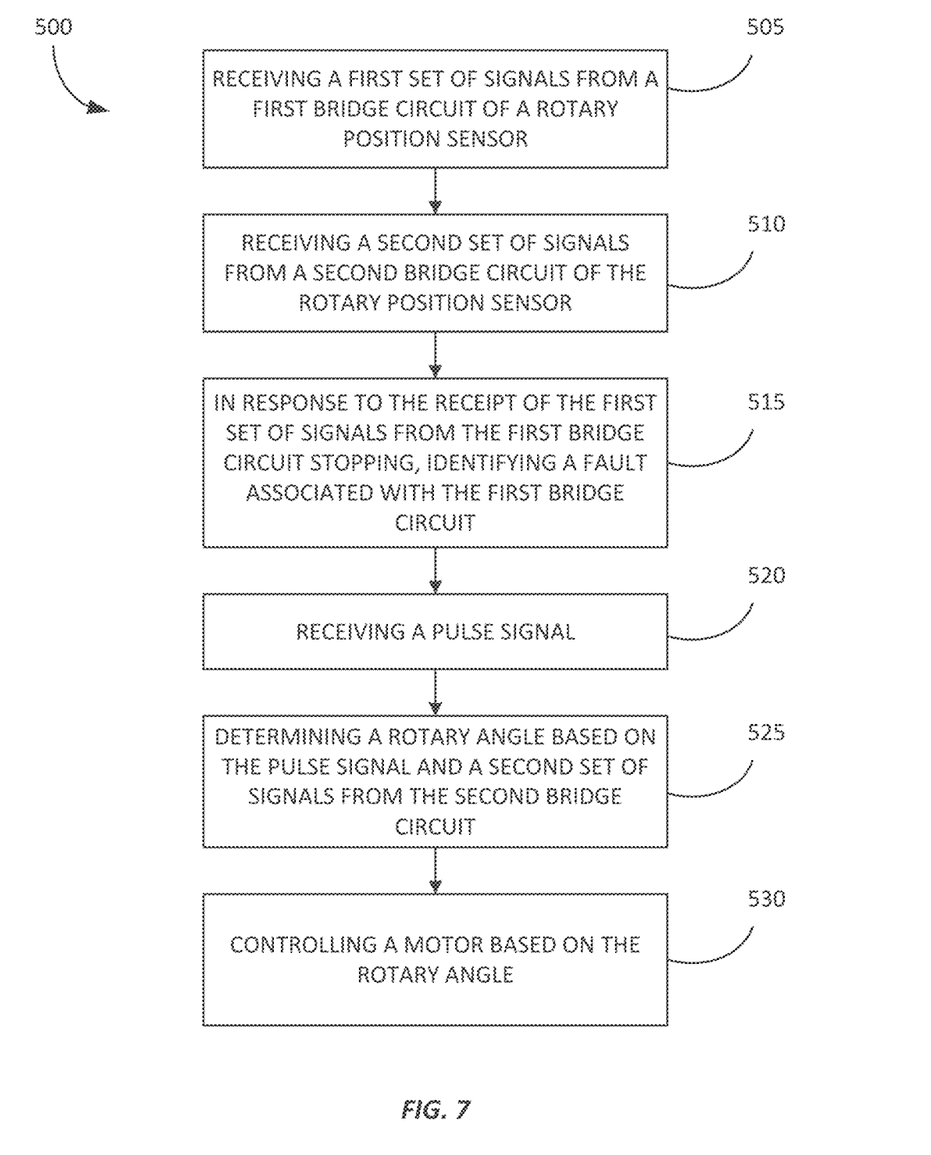
FIG. 7 is a flowchart illustrating a method of providing power steering assist using the system of FIG. 1 according to some embodiments.

As illustrated in FIG. 6, the method 500 also includes receiving, with the electronic processor of the controller 225, a pulse signal (at block 520). The pulse signal may be received by the controller 225 from the second rotary position sensing subsystem 212B (for example, a controller associated with the second rotary position sensing subsystem 212B). For example, FIG. 7 illustrates the transmission of pulse signals (for example, a first pulse signal and a second pulse signal) between the first rotary position sensing subsystem 212A and the second rotary position sensing subsystem 212B.

In some embodiments, the controller 225 continuously receives the pulse signal. However, in other embodiments, the controller 225 receives the pulse signal in response to identifying the fault associated with the first bridge circuit 220A. For example, in response to identifying the fault, the controller 225 may transmit a request to the second rotary position sensing subsystem 212B for the pulse signal and may receive the pulse signal from the second rotary position sensing subsystem 212B in response to the transmitted request.

After receiving the pulse signal, the electronic processor of the controller 225 determines a rotary angle based on the pulse signal and the second set of signals from the second bridge circuit 220B (at block 525).

Figure 8:
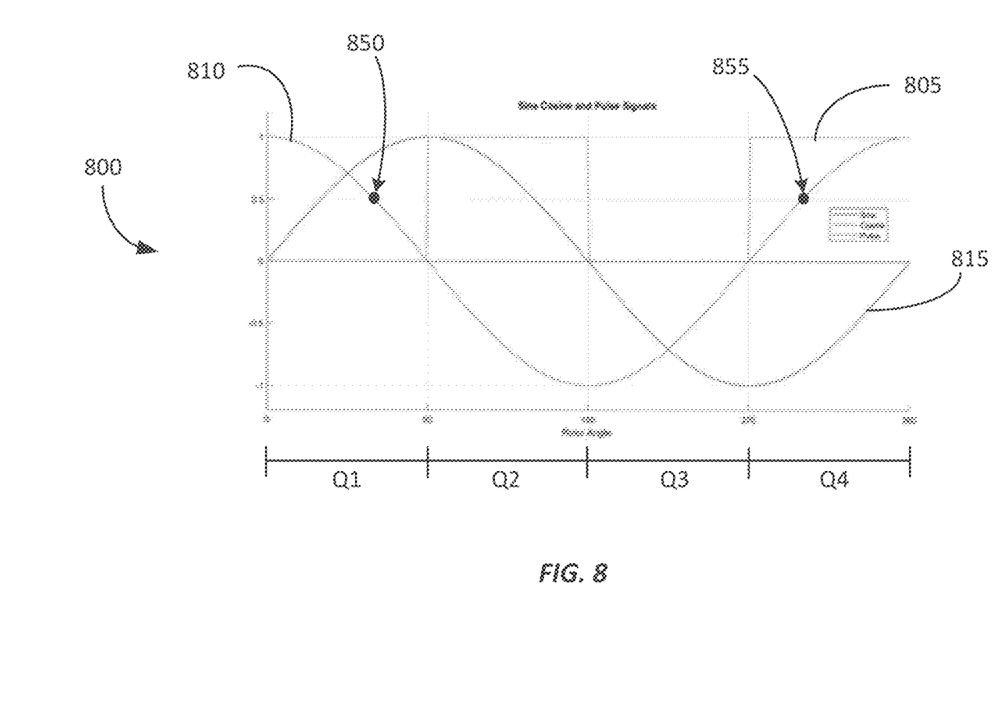
FIG. 8 is a graph illustrating a pulse signal, a cosine signal, and a sine signal.

As noted above, the pulse signal may be used to differentiate between quadrants of the unit circle in the event of a failure with one of the bridge circuits 220. Therefore, the controller 225 analyzes the pulse signal to determine a pair of quadrants. For example, FIG. 8 is a graph 800 illustrating a pulse signal 805, a cosine signal 810, and a sine signal 815. As seen in FIG. 8, the pulse signal 805 is low (or zero) in a first quadrant Q1 and a third quadrant Q3. The pulse signal 805 is high in a second quadrant Q2 and a fourth quadrant Q4. Accordingly, when the pulse signal is low (or zero), the controller 225 determines the pair of quadrants to include the first quadrant Q1 and the third quadrant Q3. When the pulse signal is high, the controller 225 determines the pair of quadrants to include the second quadrant Q2 and the fourth quadrant Q4.

After determining the pair of quadrants using the pulse signal, the controller 225 determines a correlation between the pair of quadrants and the second set of signals. For example, with reference to FIG. 8, the second set of signals may indicate a particular numerical value, such as 0.5. As seen in FIG. 8, the cosine signal 810 is 0.5 at a first instance 850 and at a second instance 855. The first instance 850 corresponds to a different angle than the second instance 855. However, the first instance 850 is within a range of angle values associated with the first quadrant Q1 and the second instance 855 is within a range of angle values associated with the fourth quadrant Q4. As noted above, the first quadrant Q1 is associated with a low (or zero) pulse signal while the fourth quadrant Q4 is associated with a high pulse signal. Therefore, when the controller 225 determines the pair of quadrants to be the first quadrant Q1 and the third quadrant Q3 (based on a low pulse signal), the controller 225 determines the rotary angle to be the angle value associated with the first instance 850. However, when the controller 225 determines the pair of quadrants to be the second quadrant Q2 and the fourth quadrant Q4 (based on a high pulse signal), the controller 225 determines the rotary angle to be the angle value associated with the second instance 855.

Figure 9:
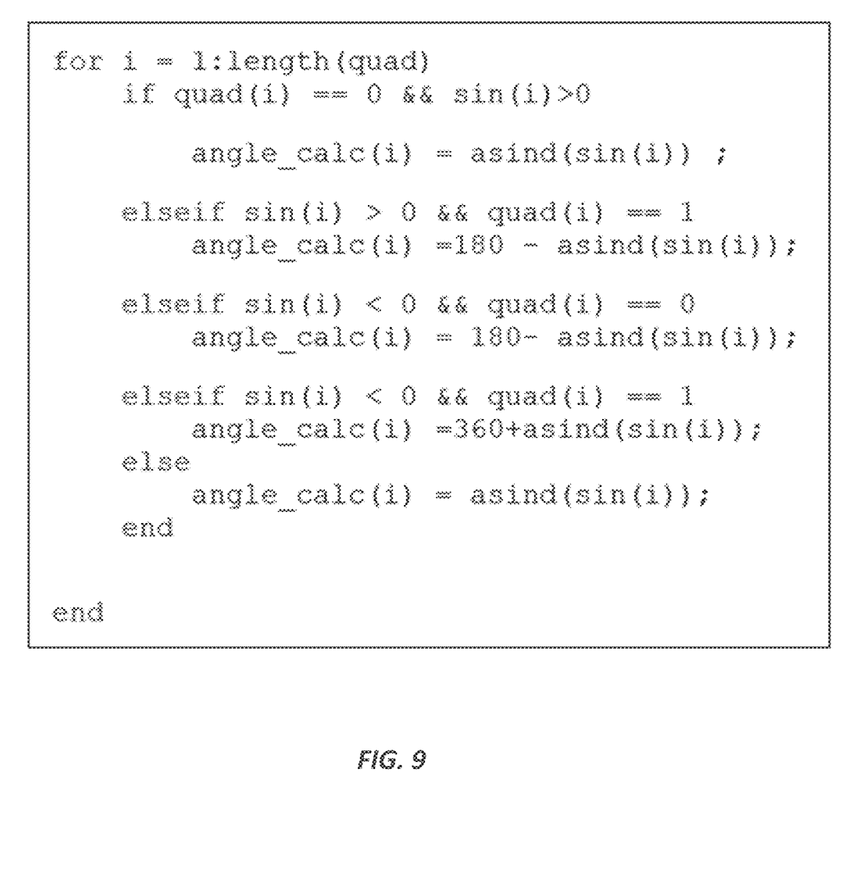
FIG. 9 illustrates an example algorithm for determining the rotary angle in a failed mode according to some embodiments.

FIG. 9 illustrates an example algorithm for determining the rotary angle in a failed mode according to some embodiments. In particular, FIG. 9 illustrates code for determining the rotary angle using the first set of signals from the first bridge circuit 22A and the pulse signal (i.e., in a failed mode where the second bridge circuit 22B failed).

Returning to FIG. 7, the method 500 also includes controlling the motor 207 based on the rotary angle (at block 530). As described above, in some embodiments, the rotary angle is a rotor angle of the motor 207 and may be used to generate an output torque value for controlling the motor 207 of the vehicle 202. Accordingly, in some embodiments, after determining the rotary angle (at block 525), the electronic processor of the controller 225 controls the motor 207 by generating an output torque value based on the rotary angle for controlling the motor 207. Alternatively, in some embodiments, the rotary angle is output to the electronic processor 250. The electronic processor 250 may use the rotary angle (i.e., a rotor angle) to determine an output torque for controlling the motor 213 and generate the output torque value for the motor 207.

Although the method 500 is described herein as being performed with respect to a fault associated with the first bridge circuit 220A, the method 500 may alternatively or in addition be performed with respect to a fault associated with the second bridge circuit 220B. For example, the electronic processor of the controller 225 may identifying a fault associated with the second bridge circuit 220B when the electronic processor no longer receives the second set of signals from the second bridge circuit 220B. In such embodiments, the electronic processor of the controller 225 determine the rotary angle based on the pulse signal and the first set of signals from the first bridge circuit 220A.

Additionally, although the method 500 is described herein as being performed with respect to a fault associated with a bridge circuit of the first rotary position sensing subsystem 212A, the method 500 may alternatively or in addition be performed with respect to a fault associated with one or more bridge circuits of the second rotary position sensing subsystem 212B. For example, an electronic processor of a controller of the second rotary position sensing subsystem 212B may identify a fault associated with one or more bridge circuits of the second rotary position sensing subsystem 212B when the electronic processor no longer receives a set of signals from the failed bridge circuit of the second rotary position sensing subsystem 212B. In such embodiments, the electronic processor determines the rotary angle based on a pulse signal (received from the controller 225 of the first rotary position sensing subsystem 212A) and a set of signals from the functioning bridge circuit.

Thus, the invention provides, among other things, methods and systems for providing power steering assist to a driver of a vehicle. Various features and advantages of the invention are set forth in the following claims.

What is claimed is:

1. A system for providing rotary position sensor information, the system comprising:
    an electronic processor configured to
        receive a first set of signals from a first bridge circuit of a rotary position sensor,
        receive a second set of signals from a second bridge circuit of the rotary position sensor,
        in response to the receipt of the first set of signals from the first bridge circuit stopping, identifying a fault associated with the first bridge circuit,
        receive a pulse signal,
        determine a pair of quadrants based on the pulse signal,
        determine a rotary angle based on the pulse signal and the second set of signals from the second bridge circuit by correlating the pair of quadrants to the second set of signals, and
        generate an output torque value based on the rotary angle for controlling a motor.

2. The system of claim 1, wherein the first bridge circuit is a Wheatstone bridge circuit.

3. The system of claim 1, wherein the rotary position sensor is a tunnel-effect magneto resistive sensor.

4. The system of claim 1, wherein the first bridge circuit is at a 90 degree angle relative to the second bridge circuit.

5. The system of claim 1, wherein the second set of signals includes a first differential sinusoidal signal and a second differential sinusoidal signal.

6. The system of claim 5, wherein the first differential sinusoidal signal has a 90 degree phase shift with respect to the second differential sinusoidal signal.

7. The system of claim 1, wherein the pair of quadrants includes a first quadrant and a third quadrant when the pulse signal is low and wherein the pair of quadrants includes a second quadrant and a fourth quadrant when the pulse signal is high.

8. The system of claim 1, wherein the pair of quadrants is associated with a unit circle.

9. A method for providing rotary position sensor information, the method comprising:
- receiving, with an electronic processor, a first set of signals from a first bridge circuit of a rotary position sensor;
- receiving, with the electronic processor, a second set of signals from a second bridge circuit of the rotary position sensor;
- in response to the receipt of the first set of signals from the first bridge circuit stopping, identifying, with the electronic processor, a fault associated with the first bridge circuit;
- receiving, with the electronic processor, a pulse signal;
- determining a pair of quadrants from based on the pulse signal;
- determining, with the electronic processor, a rotary angle based on the pulse signal and the second set of signals from the second bridge circuit by correlating the pair of quadrants to the second set of signals; and
- controlling a motor based on the rotary angle.

10. The method of claim 9, wherein controlling the motor includes generating an output torque value for the motor based on the rotary angle.

11. The method of claim 9, wherein receiving the second set of signals includes receiving a first differential sinusoidal signal and a second differential sinusoidal signal.

12. The method of claim 11, wherein receiving the first differential sinusoidal signal and the second differential sinusoidal signal includes receiving the first differential sinusoidal signal with a 90 degree phase shift with respect to the second differential sinusoidal signal.

13. The method of claim 9, wherein determining the pair of quadrants includes determining the pair of quadrants to include a first quadrant and a third quadrant when the pulse signal is low and determining the pair of quadrants to include a second quadrant and a fourth quadrant when the pulse signal is high.

14. A non-transitory, computer-readable medium storing instructions that, when executed by an electronic processor, perform a set of functions, the set of functions comprising:
- receiving a first set of signals from a first bridge circuit of a rotary position sensor;
- receiving a second set of signals from a second bridge circuit of the rotary position sensor;
- in response to the receipt of the first set of signals from the first bridge circuit stopping, identifying a fault associated with the first bridge circuit;
- receiving a pulse signal;
- determining a pair of quadrants based on the pulse signal;
- determining a rotary angle based on the pulse signal and the second set of signals from the second bridge circuit by correlating the pair of quadrants to the second set of signals; and
- controlling a motor based on the rotary angle.

15. The computer-readable medium of claim 14, wherein determining the pair of quadrants includes determining the pair of quadrants to include a first quadrant and a third quadrant when the pulse signal is low and determining the pair of quadrants to include a second quadrant and a fourth quadrant when the pulse signal is high.

* * * * *